United States Patent
Willis

(10) Patent No.: US 9,350,684 B2
(45) Date of Patent: May 24, 2016

(54) PACKET NETWORK ROUTING

(71) Applicant: BRITISH TELECOMMUNICATIONS PUBLIC LIMITED COMPANY, London (GB)

(72) Inventor: Peter Willis, London (GB)

(73) Assignee: BRITISH TELECOMMUNICATIONS public limited company, London (GB)

( * ) Notice: Subject to any disclaimer, the term of this patent is extended or adjusted under 35 U.S.C. 154(b) by 67 days.

(21) Appl. No.: 14/389,660

(22) PCT Filed: Mar. 28, 2013

(86) PCT No.: PCT/GB2013/000143
§ 371 (c)(1),
(2) Date: Sep. 30, 2014

(87) PCT Pub. No.: WO2013/144551
PCT Pub. Date: Oct. 3, 2013

(65) Prior Publication Data
US 2015/0078381 A1 Mar. 19, 2015

(30) Foreign Application Priority Data
Mar. 30, 2012 (EP) .................................... 12250083

(51) Int. Cl.
*H04L 12/935* (2013.01)
*H04L 12/741* (2013.01)
(Continued)

(52) U.S. Cl.
CPC ................ *H04L 49/30* (2013.01); *H04L 45/02* (2013.01); *H04L 45/22* (2013.01); *H04L 45/28* (2013.01); *H04L 45/54* (2013.01); *H04L 45/60* (2013.01); *H04L 45/74* (2013.01)

(58) Field of Classification Search
None
See application file for complete search history.

(56) References Cited

U.S. PATENT DOCUMENTS 7,428,209 B1 9/2008 Roberts
8,077,726 B1 12/2011 Kumar et al.
(Continued)

OTHER PUBLICATIONS

International Search Report for PCT/GB2013/000143 mailed Jun. 12, 2013.

*Primary Examiner* — Eunsook Choi
(74) *Attorney, Agent, or Firm* — Nixon & Vanderhye P.C.

(57) ABSTRACT

A line card for use in a router or packet switch is disclosed. A problem with conventional routers or packet switches is that they can take over a second to fully react to a network state update from another router or packet switch. Such network state packets are used in dynamic routing protocols intended to route packets around a failed or overloaded router. In operating in accordance with dynamic routing protocols, conventional routers or packet switches react to such network state packets by updating the routing tables used by the line cards to send packets, or data extracted from packets, to the egress port (often on a different line card in the router or network switch) appropriate for the destination address found in the packet. Any packets which arrive between the network state packet's arrival and the completion of the ensuing routing table update on the line cards, can be misrouted—which can cause them to be delayed or dropped by the network. The described embodiments address this problem by operating the line card to react to a network state update packet by running a restricted routing algorithm to provide interim routes while a conventional comprehensive routing algorithm runs in parallel to provide a comprehensive set of routes. In this way, a faster, if less thorough, reaction to the arrival of a network state update packet is provided, which reduces the risk of packets being misrouted while the network converges. The technique has application to any packet networks, but is especially useful in Internet Protocol packet networks or Multi-Protocol Label Switching networks.

11 Claims, 2 Drawing Sheets

(51) Int. Cl.
*H04L 12/751* (2013.01)
*H04L 12/707* (2013.01)
*H04L 12/703* (2013.01)
*H04L 12/773* (2013.01)

(56) References Cited

U.S. PATENT DOCUMENTS

| | | | | |
|---|---|---|---|---|
| 2010/0043068 | A1* | 2/2010 | Varadhan | H04L 12/4633 726/15 |
| 2010/0150155 | A1* | 6/2010 | Napierala | H04L 45/00 370/390 |
| 2010/0215047 | A1 | 8/2010 | Filsfils et al. | |
| 2010/0306574 | A1* | 12/2010 | Suzuki | H04L 45/00 714/4.1 |
| 2011/0075680 | A1 | 3/2011 | Sun et al. | |
| 2011/0096777 | A1* | 4/2011 | Paul | H04L 49/3009 370/389 |
| 2011/0122874 | A1* | 5/2011 | Pacella | H04L 45/00 370/392 |
| 2012/0020364 | A1* | 1/2012 | Zinjuwadia | H04L 45/02 370/401 |
| 2012/0127854 | A1* | 5/2012 | Khetan | H04L 12/4641 370/218 |
| 2012/0201252 | A1* | 8/2012 | Subramanian | H04L 45/125 370/401 |

* cited by examiner

PACKET NETWORK ROUTING

This application is the U.S. national phase of International Application No. PCT/GB2013/000143 filed 28 Mar. 2013 which designated the U.S. and claims priority to EP 12250083.8 filed 30 Mar. 2012, the entire contents of each of which are hereby incorporated by reference.

BACKGROUND AND SUMMARY

The present invention relates to apparatus and methods for routing packets in a packet network.

Whilst conventional routers in packet networks can forward millions of packets per second, their response to a signalling packet signalling a change in network characteristics can take more than a second. This can lead to the mis-routing of hundreds of thousands of packets—in turn possibly leading to routing loops which at best cause delay and at worst cause the packet to be dropped by the network. For some customers of network operators (e.g. financial traders running algorithmic trading systems) delay or loss of a packet can be very expensive. There is a need to speed up the process of adapting to a change in network characteristics—a process known as convergence or re-convergence in the art.

US Patent application 2011/0075680 discloses a router which includes a plurality of line cards. Each of the line cards has storage for a global Forwarding Information Base, and a complete local Forwarding Information Base which includes a copy of less than all the entries in the global Forwarding Information Base. Each line card determines how to forward packets based on the complete local Forwarding Information Base.

According to a first aspect of the present invention, there is provided a line card for use in a communications network node having a plurality of line cards in digital electronic communication with a routing processor shared by the line cards, said line card having:

one or more line interfaces for connection to communication lines in a communications network, said interfaces being arranged to receive network packets addressed to nodes in said communications network;

one or more interfaces arranged to transmit network packets processed by said line card to another of said line cards;

said line card being arranged in operation to:

i) receive network state, updates from other, routers via communications lines terminating at the line cards;

ii) pass said network state updates to the shared routing processor for input into a comprehensive routing process run by the shared routing processor which occasionally generates a set of comprehensive routes for use by the line cards; and iii) route incoming packets on the basis of the received comprehensive set of routes;

said line card being characterised by:

being arranged to further respond to receiving a network state update by calculating one or more interim routes taking said received network state update into account, and routing incoming packets over said interim routes until the next occasion on which a comprehensive set of routes is received from said shared routing processor.

The performance of a communications network having a plurality of line cards in digital electronic communication with a routing processor shared by the line cards, in which the line cards:

i) receive network state updates from other routers via communications lines terminating at the line cards;

ii) pass said network state updates to the shared routing processor for input into a comprehensive routing process run by the shared routing processor which occasionally generates a set of comprehensive routes for use by the line cards; and iii) route incoming packets on the basis of the received comprehensive set of routes;

is improved by arranging one or more of the line cards to further respond to receiving a network state update by running an interim routing process to generate one or more interim routes, and routing incoming packets over said interim routes until the next occasion on which a comprehensive set of routes is received. In particular, routing in reaction to a network state change is improved in that some rapid routing changes are made in reaction to the network status update before more thorough routing changes are applied.

It is to be noted that in some embodiments, the routing processor comprises one or more routing processor cards present in a router which includes the line card. In other embodiments, the routing processor comprises a control plane system shared by the routers in a communications network.

Preferably, the line card is further arranged to judge the importance of the network state update, and only run said interim routing process on said network state update being found to be important. This has the result that the extra processing required to generate interim routes is only carried out when required.

Preferably, said interim routing process generates routes for a portion of the network local to the router. This enables the accurate routing of those packets which are addressed to local nodes in the network (local nodes being a subset of the nodes in the network which are closer to the router than the remainder of nodes in the network), without the concomitant delay in calculating routes to all nodes in the network.

Preferably, the line card has bespoke hardware configured to perform said interim routing process. The bespoke hardware might comprise a field programmable gate array programmed to perform said interim routing process. This is faster than using a general purpose microprocessor, but maintains some programmability. In other embodiments, the bespoke hardware might comprise an application-specific integrated circuit. Again, this is faster than using a general purpose microprocessor.

BRIEF DESCRIPTION OF THE DRAWINGS

There now follows, by way of example only, a description of embodiments of the present invention. The description is given with reference to the accompanying drawings in which.

DETAILED DESCRIPTION

Figure 1:
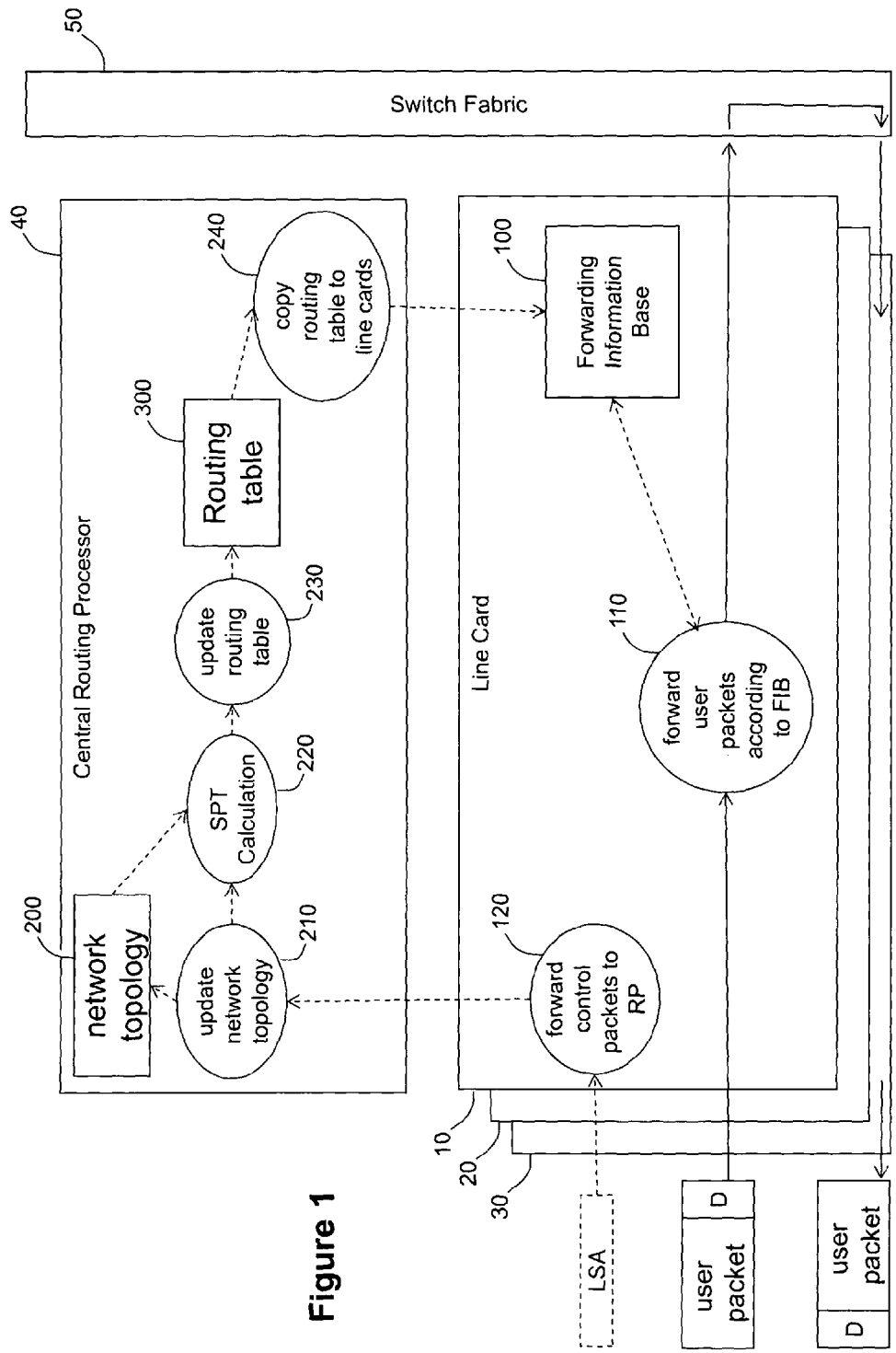
FIG. 1 shows the operation of a conventional router.

A conventional internetwork router (FIG. 1) comprises a card chassis (not shown) offering slots in which various types of electronic system boards (known as cards) are inserted. The various types of cards include line cards (10,20,30) which expose one or more physical ports onto which communication lines (e.g. optical fibres) can be connected. A second type of card is a route processor card 40 which performs centralised computations and management functions for the router. In particular, on the basis of network characteristic information packets received from the network via the line cards, the route processor card 40 calculates a network topology and, from that, a shortest path tree to each node in the network. A third type of card is a switch fabric card 50 which routes data between line cards in accordance with routing information applied to the data by the line cards. The chassis provides physical connectors which connect to mating connectors on the back of the cards. The chassis includes a backplane or bus which provides digital electronic communication between the cards inserted into the slots provided in the chassis.

The normal routing operation of a conventional router involves the use of a Forwarding Information Base 100 which is a directory listing, for destination IP addresses or groups of destination IP addresses (so-called address prefixes), the output interface of the router from which a packet should be sent in order to forward the packet towards its destination.

On receiving a traffic packet, (or more generally, a datagram carrying traffic data), the line card (10,20,30) carries out a user traffic handling process 110 which involves looking up the destination address found in the packet in the Forwarding Information Base 100 to find the outbound communications line (interface) through which the packet should be output from the router, labelling the packet with some routing information to direct it to the selected output interface, and then sending the labelled packet to the switch fabric card 50. The switch fabric card in turn reads the label applied by the line card (10,20,30), and routes the packet to the whichever line card (10,20,30) hosts the selected outbound communications line for onward transmission from the router.

On receiving a signalling packet, in particular a link state packet for input to the Open Shortest Path First routing algorithm being run on the Central Routing Processor 40, the line card routes 120 the packet via the backplane or bus to the Central Routing Processor card 40.

The Central Routing Processor card includes memory 200 which stores data representing the topology of the network in which the router forms a node. The representation represents the nodes, the edges (i.e. communication lines) connecting the nodes, and two performance metrics for each of the edges (one for each direction of communication along the edge). On receiving a link state packet from one of the line cards, the Central Routing Processor 40 updates 210 the network topology stored in the memory 200. A shortest path first algorithm is then run 220 (on a processor connected via a bus to the memory 200 storing the network topology). This algorithm calculates the shortest path through the network from the router to all other nodes (routers and terminals) in the network. Having calculated the shortest paths, the first step in those paths, namely the output interface of the router which lies on the shortest path towards each destination in the network is recorded 230 in memory 300.

As will be understood by those skilled in the art, the majority of routes in most modern IP networks are carried by the Border Gateway Protocol. This is used by internetwork routers to find which networks should be used to route a packet through the internetwork to its destination.

The Forwarding Information Base combines the global routes that the router learns using the Border Gateway Protocol with the local routes the router learns using an Interior Gateway Protocol (e.g. Open Shortest Path First). This has the result that the Forwarding Information Base is much larger than would be the case were only those routes learnt using an Interior Gateway Protocol included.

The contents of the Forwarding Information Base are occasionally copied 240 from a Routing Information Base maintained by whichever route processor card 40 handles the plurality of line cards 10,20,30 to which the line card 10 hosting the Forwarding Information Base 100 belongs. As described in the paper "Achieving sub-second IGP convergence in large IP networks" by Pierre Francois et al presented in *SIGCOMM Comput. Commun. Rev.* 35, 3 (July 2005), p 35-44, the operating system program running on the processor on the Central Route Processor is arranged to schedule the 'update routing table' 230 and 'copy routing to line cards' 240 processes in alternating 50 ms timeslots. The most important prefixes are written to the routing table in the first 50 ms interval, and copied to the line cards in the next 50 ms interval. In large networks, more than ten rounds (i.e. twenty 50 ms intervals) are required before the entire routing table has been copied to all the line cards.

In addition to updating its routing tables as described above, the conventional central routing processor 40 floods any link state advertisement packet it receives from a line card immediately to all outgoing ports on the router, save for the port which it arrived on. By each router similarly immediately flooding link state advertisements, the information about the network state (the link state advertisement) is rapidly promulgated to all routers in the network.

Figure 2:
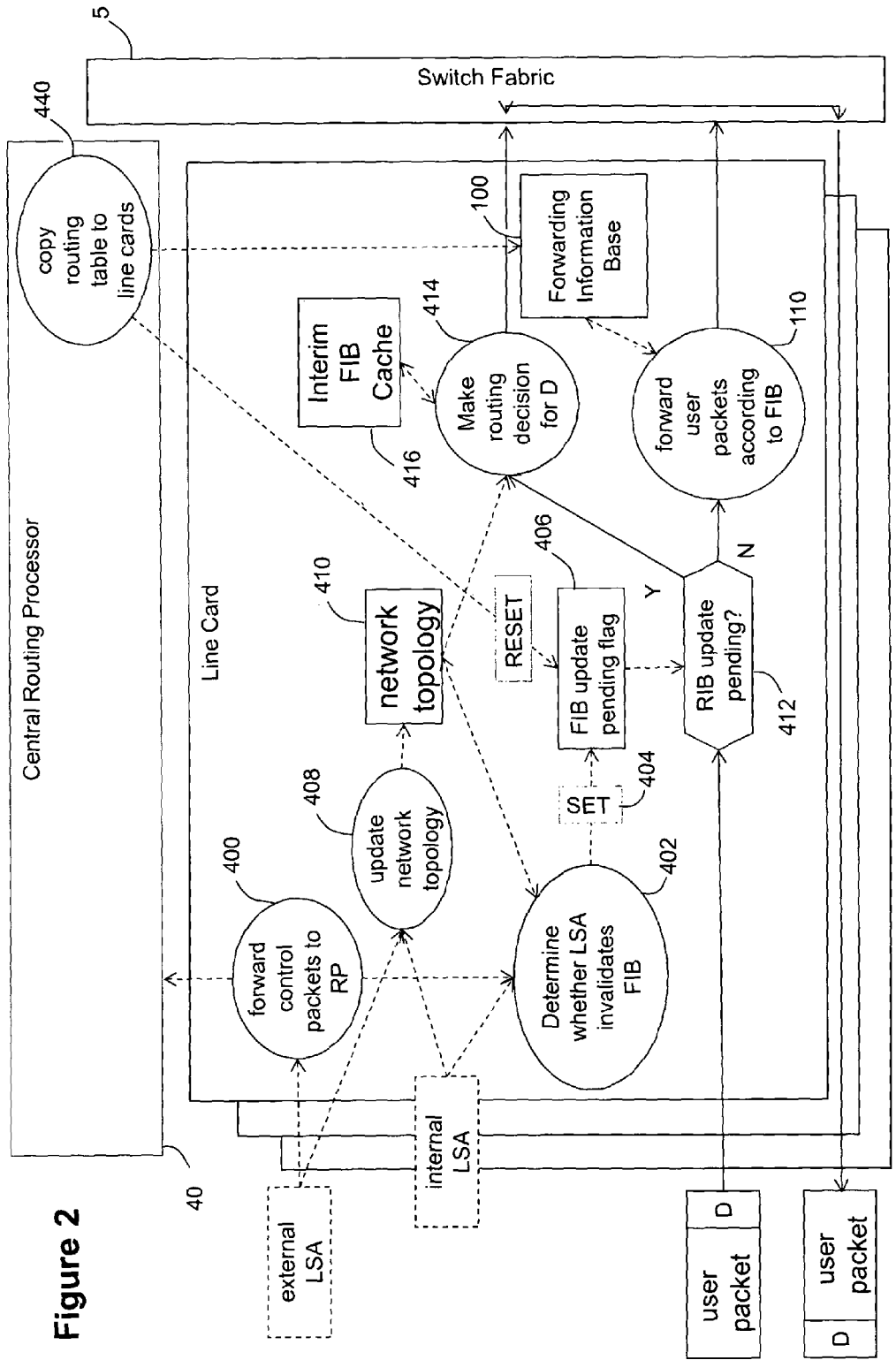
FIG. 2 shows the operation of a router according to a first embodiment.

A router (FIG. 2) according to the present embodiment has a conventional Central Routing Processor, save for a minor addition to the process for copying a routing table to the line card. However, line cards of the present embodiment include extra hardware and software in comparison to conventional line cards as will be described below.

An external link state advertisement handling procedure 400 forwards 120 an external link state advertisement to the Central Processor as is done in a conventional router.

The external LSA handling procedure is further extended by having the link state advertisement passed to hardware (e.g. an Field Programmable Gate Array (FPGA), or Network Processor (NPU) or Application Specific integrated Circuit (ASIC)) which is configured to make a determination 402 as to whether the link state advertisement is likely to lead to an update of the Forwarding Information Base 100 by the Central Routing Processor 40. The determination can simply assume that any link state advertisement which adds or deletes an edge from the network topology database makes will invalidate the current. Forwarding Information Base 100. Alternatively, any link state advertisement which changes a link performance metric by more than, say, a given deviation from a moving average of that performance metric might be assumed to invalidate the current Forwarding Information Base 100. More generally, the hardware makes a comparison between the link state advertisement and the network topology, and if the link state advertisement discloses a significant change to that topology, then the determination process 402 sets 404 a RIB update pending flag 406 (again in hardware). Those skilled in the art will be able to suitably configure hardware to perform such an operation.

A refinement to reduce false positives (i.e. setting the RIB update pending flag 406 when the link state advertisement change would not impact the accuracy of the normal FIB 100) would be to run Dijkstra's shortest path first algorithm for the IP addresses that identify the other routers (available from the link state advertisements and stored in the Network Topology Database 410) and if all the routes to the other routers remain the same assume the link state advertisement does not invalidate the FIB 100.

Internal LSAs (received from another line card in the router) are also passed to the flag-setting hardware (402, 404, 406) and handled in the same way as external link state advertisements.

To minimise the risk of packets being forwarded to the wrong destination, or dropped, whilst the hardware (402, 404, 406) determines if the link state advertisement invalidates the FIB 100, it is preferred to arrange the hardware (402, 404, 406) to set the RIB Update Pending Flag 406 when any LSA is received and to have the hardware reset the flag 406 only if the hardware indicates that the link state advertisement does not invalidate the Forwarding Information Base 100.

The line card stores a representation of the network topology 410 in memory. This is updated in reaction to internal and external link state advertisements using an update process 408 similar to the update process 210 used on the Central Route Processor 40.

On arrival of a user packet at the line card, the line card's hardware is arranged to pass the user packet directly to the conventional packet forwarding process 110 on a hardware determination 412 of whether the RIB update pending flag is set finding that the flag 406 is not set (i.e. the Forwarding Information Base 100 is valid).

However, if the hardware determination 412 finds that the RIB update pending flag is set (i.e. the Forwarding Information Base in invalid), then the incoming packet is passed directly to destination-specific routing hardware 414.

In order to reduce forwarding delays whilst the RIB update pending flag 406 is set, the destination-specific routing hardware stores destination address output interface pairs it establishes in an Interim FIB Cache 416 stored in memory (for example stored in a look-up table provided as part of an FPGA package). Thus, the Interim Forwarding Information Base cache 416 is a list of valid forwarding information that has already been calculated by the destination-specific routing hardware whilst the Forwarding Information Base is in an incorrect state.

The hardware is configured to directly forward the packet to the correct output interface if an output interface for the destination address of the incoming packet is found in the Interim FIB Cache 416.

Suitable hardware configurations for the destination-specific routing hardware (in particular FPGA-5 based architectures) are disclosed in Matti Tommiska and Jorma Skytt's 2001 paper "Dijkstra's Shortest Path Routing Algorithm in Reconfigurable Hardware." found in the *Proceedings of the 11th International Conference on Field-Programmable Logic and Applications* (FPL '01), Gordon J. Brebner and Roger Woods (Eds.). Springer-Verlag, London, UK, 653-657, and Sridharan, K.; Priya, T. K.; Kumar, P. R.'s paper; "Hardware architecture for finding shortest paths," *TENCON 2009-2009 IEEE Region 10 Conference*, vol., no., pp. 1-5, 23-26 Jan. 2009.

If an entry giving a suitable output interface for the destination address D is not found in the Interim FIB Cache 416, then the destination-specific routing hardware determines the correct output interface for the packet using a configuration similar to that described in the above papers, and forwards the packet to the correct output port via the switch fabric 50. It also caches the result of its calculation for the destination address D, in the Interim FIB cache 416.

When the Normal FIB, 100, is completely updated the augmented copy routine 440 running on the central routing processor 40 resets the RIB update pending Flag 406, and normal forwarding is resumed.

The link state advertisement handling hardware clears the Interim FIB cache each time a new LSA is received.

It will be seen how the line card of the present embodiment configures hardware to rapidly provide interim routing decisions for packets which arrive shortly (up to a second) after a link state advertisement is received. The provision of such interim routing decisions results in the incorrect routing of fewer packets following a significant change in the network. It will also be seen how this is achieved with only a minor performance penalty in relation to normal routing at times when the network is stable.

Many variations on the above-described embodiment are, possible. These include but are not limited to:

i) instead of, or in addition to IP packet forwarding, the interim routing might be applied to Multi-Protocol Label Switching routers. In comparison to existing fast re-route, mechanisms provided by MPLS routers, the above embodiment offers reduced complexity. This is especially true because the embodiment is transparent to network operators (network operators will not have to manage or configure the embodiment), so network management is simplified.

ii) instead of, or in addition to, OSPF mentioned above, the embodiment could be adapted to handle other link state routing protocols—e.g. IS-IS routing protocols, or distance-vector routing protocol—e.g. RIP.

iii) whilst specially-configured hardware was used to provide rapid assessment of the importance of a link state advertisement in the above embodiment, similar functionality could be embodied in software. Similarly, whilst specially-configured hardware was used to provide a rapid calculation of a route for a given destination, similar functionality could be embodied in software. Whilst the resulting reaction to a change in network state would not be as fast as seen in the above embodiment, the use of an interim routing process which is less complex than the thorough routing process performed by the central route processor card still outperforms conventional routing. This is in addition to the speed benefits which result from performing a routing calculation on each line card, and thereby avoiding the time required to copy a routing table calculated by the central routing processor card to each line card.

iv) in the above embodiment, the interim routing process calculated routes to single destinations rather than building a shortest path tree spanning the entire network. In other embodiments, a speed improvement over a conventional network-wide routing table calculation is achieved by generating routes for a portion of the network local to the router. This enables the accurate routing of those packets which are addressed to local nodes in the network (local nodes being a subset of the nodes in the network which are closer to the router than the remainder of nodes in the network), without the concomitant delay in calculating routes to all nodes in the network. The nodes considered might, for example, be those within a set number of hops of the router.

v) in some embodiments, progress of the destination-specific routing algorithm used whilst the RIB update pending flag is set is monitored, and if a route for the particular destination is not found within a predetermined threshold amount of time then the calculation for that particular destination is aborted and the packet is dropped. This prevents the queue of packets awaiting forwarding backing up behind the current packet should no route for the packet be available or should the destination-specific routing algorithm get stuck in a loop.

vi) in some embodiments, the router forms a node in a Software-Defined Network, and the Forwarding Information Base is calculated by and received from a system offering control plane functionality shared by the nodes in the network, instead of being calculated by and received from the central routing processor. In this case, the delay in downloading the FIB to the line cards is even greater than the delay in downloading the FIB to the line cards from the central routing processor. Hence, such embodiments offer an even greater performance improvement.

In summary of the above disclosure, a line card for use in a router or packet switch is disclosed. A problem with conventional routers or packet switches is that they can take over a second to fully react to a network state update from another router or packet switch. Such network state packets are used in dynamic routing protocols intended to route packets around a failed or overloaded router. In operating in according with dynamic routing protocols, conventional routers or packet switches react to such network state packets by updating the routing tables used by the line cards to send packets, or data extracted from packets, to the egress port (often on a different line card in the router or network switch), appropriate for the destination address found in the packet. Any packets which arrive between the network state packet's arrival and the completion of the ensuing routing table update on the line cards, can be misrouted—which can cause them to be delayed or dropped by the network. The described embodiments address this problem by operating the line card to react to a network state update packet by running a restricted routing algorithm to provide interim routes whilst a conventional comprehensive routing algorithm runs in parallel to provide a comprehensive set of routes. In this way, a faster, if less thorough, reaction to the arrival of a network state update packet is provided, which reduces the risk of packets being misrouted whilst the network converges. The technique has application to any packet networks, but is especially useful in Internet Protocol packet networks or Multi-Protocol Label Switching networks.

What is claimed is:

1. A line card for use in a communications network node having a plurality of line cards, said line card, in use, being in communication with a routing processor shared by the line cards, said line card comprising:
   one or more line interfaces for connection to communication lines in a communications network, said interfaces being arranged to receive network packets addressed to nodes in said communications network;
   one or more interfaces arranged to transmit network packets processed by said line card to another of said line cards;
   said line card being arranged in operation to:
      i) receive a network state update via a communications line terminating at the line card;
      ii) pass said network state update to the shared routing processor for input into a routing process run by the shared routing processor which occasionally generates a set of routes for use by the line card;
      iii) receive said set of routes from said shared routing processor; and
      iv) route incoming packets on the basis of the received set of routes;
   said line card being arranged to further respond to receiving a network state update by calculating one or more interim routes taking said received network state update into account, and routing incoming packets over said interim routes until said set of routes is received from said shared routing processor.

2. A line card according to claim 1 wherein said line card is further arranged to calculate said one or more interim routes only on finding said network state update to be likely to impact the routing of packets arriving at the line card.

3. A line card according to claim 1 wherein said interim routing calculation calculates a route for one or more destination addresses found in one or more packets which arrive at said line card between the receipt of said network state update and the receipt of said set of routes.

4. A line card according to claim 1 further comprising bespoke hardware for performing said interim routing calculation.

5. A line card according to claim 4 wherein said bespoke hardware comprises a field programmable gate array programmed to perform said interim routing calculation.

6. A line card according to claim 4 wherein said bespoke hardware comprises an application-specific integrated circuit.

7. A router comprising a line card according to claim 1.

8. A method of operating a line card for use in a router having a plurality of line cards, said line card, in use, being in communication with a routing processor shared by the line cards, said method comprising:
   operating said line card to:
      i) receive a network state update from another router via a communications line terminating at the line card;
      ii) pass said network state update to said routing processor for input into a routing process run by the shared routing processor which occasionally generates a set of routes for use by the line cards;
      iii) receive said set of routes from said shared routing processor; and
      iv) route incoming packets on the basis of the received set of routes;
   said method further comprising operating said line card to further respond to receiving a network state update by calculating one or more interim routes taking said received network state update into account, and routing incoming packets over said interim routes until said set of routes is received from said shared routing processor.

9. A non-transitory machine readable storage medium tangibly embodying a program of instructions executable by one or more processors on said line card to operate said line card in accordance with the method of claim 8.

10. The method according to claim 8 further comprising:
   operating said line card to calculate said one or more interim routes only on finding said network state update to be likely to impact the routing of packets arriving at the line card.

11. The method according to claim 8 wherein said calculating one or more of the interim routes includes calculating a route for one or more destination addresses found in one or more packets which arrive at said line card between the receipt of said network state update and the receipt of said set of routes.

* * * * *